United States Patent [19]
Brefka

[11] 3,909,908
[45] Oct. 7, 1975

[54] METHOD FOR MAKING CASES FOR PANEL-MOUNTED ELECTRICAL INSTRUMENTS

[75] Inventor: Paul E. Brefka, Southboro, Mass.
[73] Assignee: Analog Devices, Inc., Norwood, Mass.
[22] Filed: Jan. 3, 1974
[21] Appl. No.: 430,466

Related U.S. Application Data
[62] Division of Ser. No. 304,732, Nov. 8, 1972, Pat. No. 3,793,563.

[52] U.S. Cl. .................. 29/417; 29/453; 29/526
[51] Int. Cl.² .............................. B23P 17/00
[58] Field of Search ....... 29/417, 453, 526; 220/3.5, 220/3.6; 317/101 DH, 107, 105; 324/156

[56] References Cited
UNITED STATES PATENTS

| | | |
|---|---|---|
| 1,030,858 | 7/1912 | Ames .................................. 220/3.6 |
| 2,167,419 | 7/1939 | Heanes .............................. 317/105 |
| 2,426,800 | 9/1947 | Triplett .............................. 324/156 |
| 3,335,214 | 8/1967 | Brotherhood ................... 220/3.6 X |
| 3,337,076 | 8/1967 | Ast ...................................... 220/3.6 |
| 3,344,502 | 10/1967 | Maier .................................... 29/417 |
| 3,780,353 | 12/1973 | Gordon ....................... 317/101 DH |

*Primary Examiner*—Charlie T. Moon
*Attorney, Agent, or Firm*—Parmelee, Johnson & Bollinger

[57] ABSTRACT

A protective case arranged to contain an electrical instrument and to mount it upon an instrument panel in an opening provided therein is characterized by a tubular extruded body cut to preselected length to match the instrument contained, and a panel mount secured to the tubular body at one open end and having a mounting flange opposing resilient stepped catches to engage therebetween instrument panels of arbitrary thickness with the flange in each case abutting the front face of the instrument panel. The flange has snap catches located in its outer periphery to removably engage a front cover so that its peripheral wall is in flush contact with the instrument panel.

9 Claims, 9 Drawing Figures

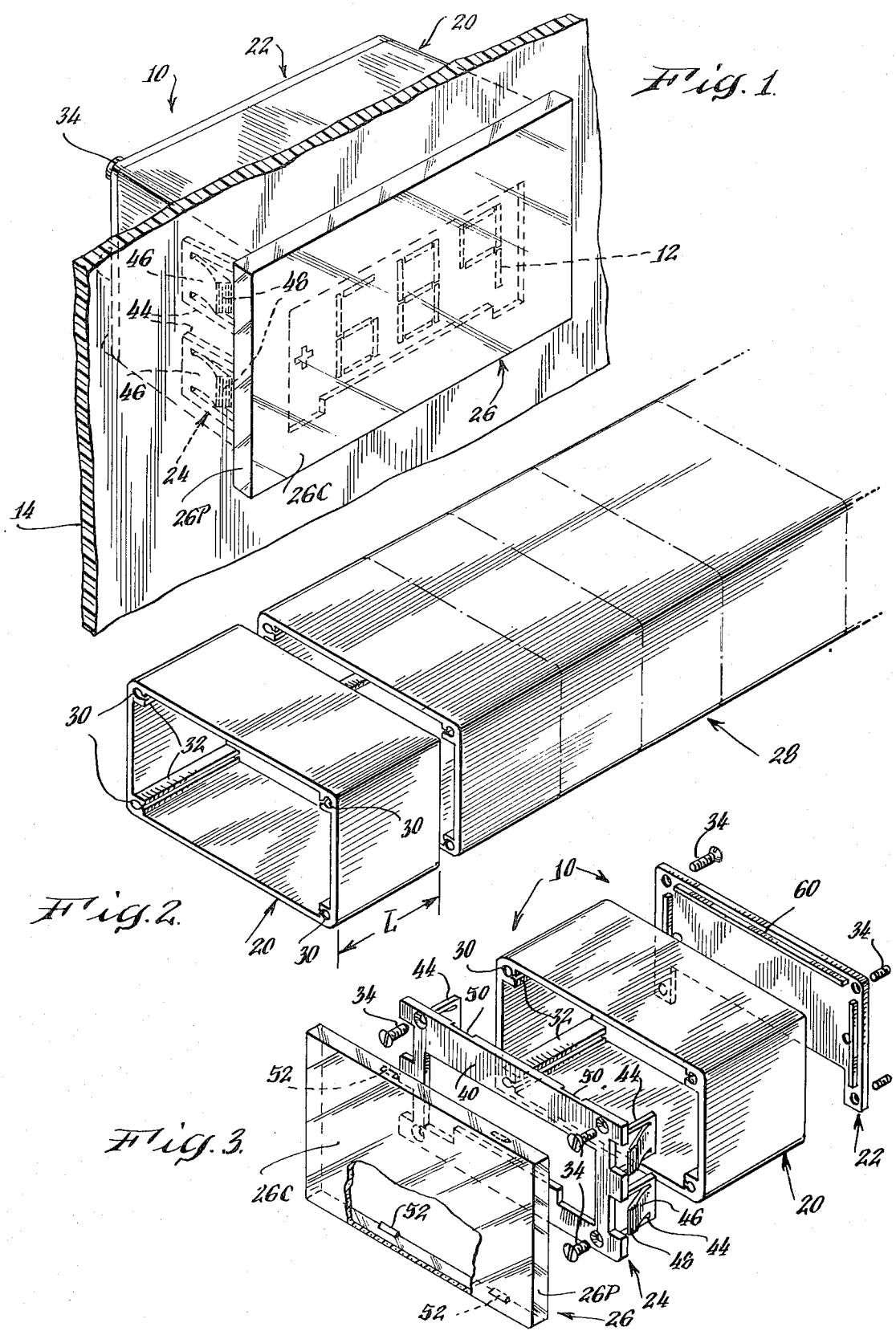

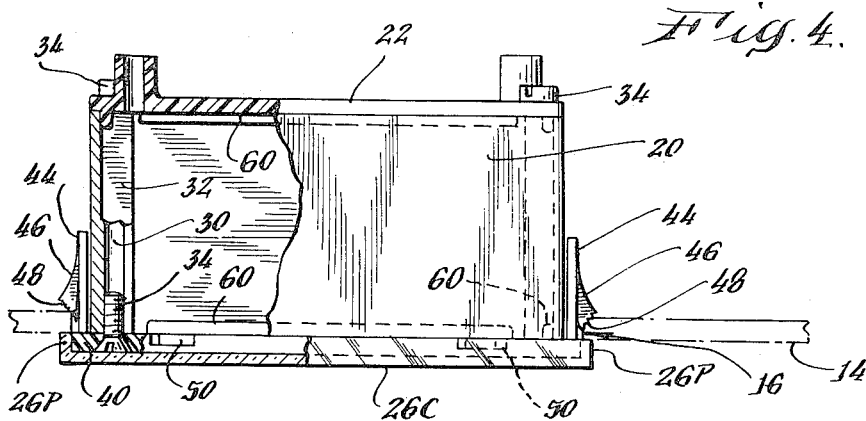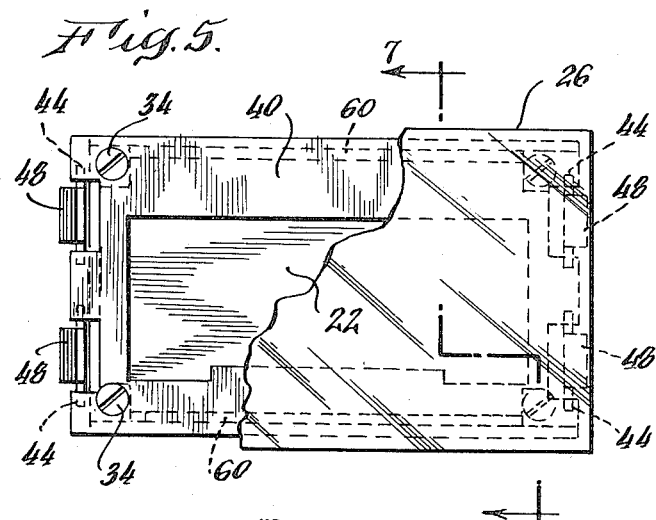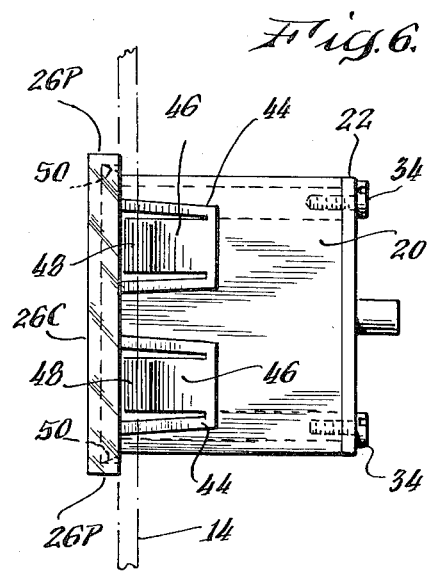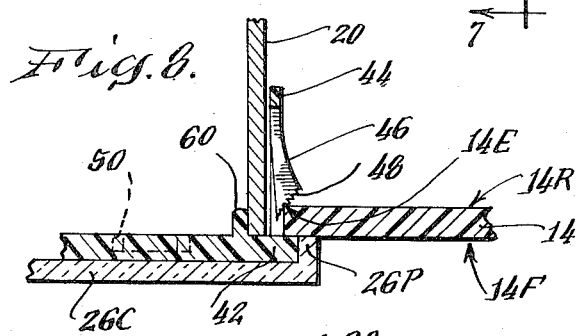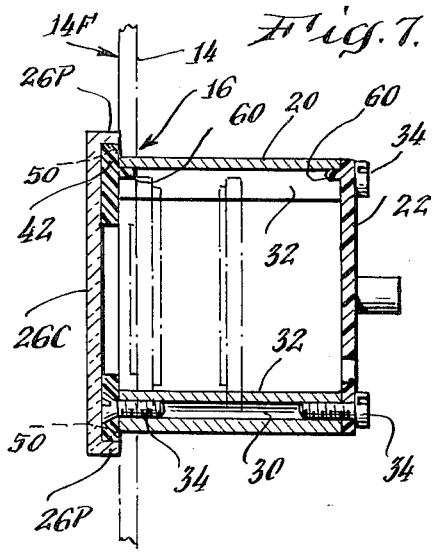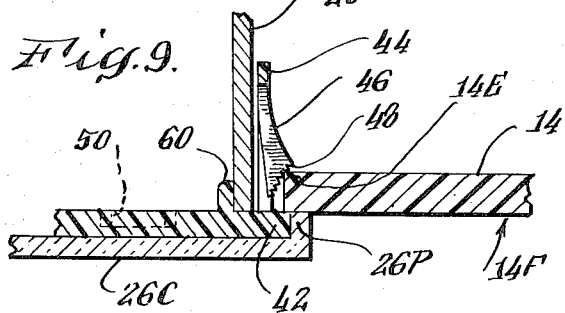

METHOD FOR MAKING CASES FOR PANEL-MOUNTED ELECTRICAL INSTRUMENTS

This is a division, of Application Ser. No 304,732 filed Nov. 8, 1972, now U.S. Pat. No. 3,793,563.

BACKGROUND OF THE INVENTION

1. Field of the Invention

This invention relates to cases or housings for electrical instruments, and more particularly to such cases which are to be mounted upon an instrument panel in an opening provided therein. An example of the use of such cases is in the mounting of digital panel meters.

2. Description of the Prior Art

Known cases for panel-mounted instruments are generally fabricated to accommodate particular instruments. New instruments require a new design and new tooling. Moreover, known case constructions do not lend themselves well to rapid and sure mounting on an instrument panel. Where screw fasteners are employed, mounting can be time-consuming and tedious. In addition, known cases do not readily provide for flush mounting on the instrument panel and concealment of the mounting means irrespective of the thickness of the panel. These and other drawbacks of known constructions for panel-mounted cases tend to make such cases expensive, difficult to use, and lacking in esthetic appeal.

SUMMARY OF THE INVENTION

The objects of the present invention are to provide panel-mounted instruments with a case whose design and construction adapt very easily to different electrical instruments, whose construction permits the case to be easily mounted to an instrument panel of arbitrary thickness, and to be mounted with the instrument cover in flush engagement with the instrument panel irrespective of the thickness of the panel.

According to the invention, the protective case for containing an electrical instrument and for mounting it upon an instrument panel in an opening provided therein, comprises a tubular extruded body with open ends and having fastener receiving channels formed at selected interior points and extending throughout the length of the body. Secured to the tubular body at one open end is a panel mounting member which has a flange abutting the front face of the instrument panel and catches, for example of a stepped type, which resiliently engage the rear face of the instrument panel and hold the case in position. In additional aspects, the panel mounting member has snap catches formed in the outer periphery of its flange which engage a wall formed about the perimeter of a front cover. The front cover thus fits flush against the front face of the instrument panel, concealing the panel mounting member, with an esthetically pleasing appearance, but is readily removed.

In another aspect, the present invention relates to a method for making protective cases for panel-mounted instruments. The method entails forming a tubular body as described above by extruding it as a continuous member with fastener receiving channels in its interior surface, cutting the extruded tubular member into individual bodies with lengths accommodating the particular instruments to be housed, and thereafter fastening end portions on the tubular bodies by means of fasteners inserted into the fastener receiving channels in the bodies.

Other objects, aspects and advantages of the invention will be pointed out in, or apparent from, the detailed description hereinbelow, considered together with the following drawings.

DESCRIPTION OF THE DRAWINGS

FIG. 1 is a perspective view of a protective case constructed according to the principles of the present invention, showing it as attached to an instrument panel and containing a digital panel meter;

FIG. 2 is a perspective view illustrating the formation of tubular bodies employed in the protective case of the present invention;

FIG. 3 is an exploded perspective view of the case shown in FIG. 1;

FIG. 4 is a plan view of the case shown in FIG. 1, with portions in section;

FIG. 5 is a front elevation of the case of FIG. 1, with portions of the front cover removed;

FIG. 6 is a side elevation of the case of FIG. 1, as seen from the right side of FIG. 5;

FIG. 7 is a section on line 7—7 of FIG. 5; and

FIGS. 8 and 9 are partial sections through the catches showing fastening of the case to instrument panels of different thicknesses.

DESCRIPTION OF THE PREFERRED EMBODIMENT

FIG. 1 illustrates a protective enclosure or case 10 constructed in accordance with the principles of the present invention. The case 10 houses an electrical instrument 12, such as the digital panel meter shown in FIG. 1, and is arranged for mounting upon an instrument panel 14 having an opening 16 provided therein (see, e.g., FIGS. 4 and 7). As shown in FIG. 3, case 10 has a tubular body member 20, a rear cover 22 fastened over one open end of tubular body 20, a panel mounting member 24 fastened at the other open end of tubular body 20, and a front cover 26 which engages panel mounting member 24.

In order to permit case 10 to accommodate electrical instruments 12 of varying dimensions, the tubular body 20 is cut to suitable length L from an extruded member 28 (FIG. 2), formed for example of aluminum. As shown in FIGS. 2 and 3, the tubular member 28, and hence each tubular body 20, has a rectangular cross section with four side walls. In the interior corners where the side walls join, rounded channels 30 are formed between extruded ridges or walls 32 to receive screw fasteners 34 (FIGS. 3 and 4). Accordingly, for whatever length L is desired for tubular body 20, there will exist automatically upon cutting of tubular member 28 a set of four fastener receiving channels 30 at each open end of tubular body 20.

As shown in FIGS. 3 and 4, rear cover 22 and panel mounting member 24 of case 10 are attached to the tubular body 20 by means of screw fasteners 34 which are inserted into fastener receiving channels 30.

Panel mounting member 24, as shown in FIGS. 3 through 6, is formed from a single piece of injection molded plastic, and is arranged to automatically grip instrument panel 14 when case 10 is inserted in opening 16 therein. Panel mounting member 24 has a planar portion 40 which abuts the end surface of tubular body 20 and provides a flange 42 extending outwardly from the periphery of tubular body 20 so as to contact the front face 14F of instrument panel 14 (FIGS. 7-9). Extending rearward from planar portion 40, in contact with opposite side walls of tubular body 20, are four U-shaped frames 44 carrying resilient catch members 46.

In their normal state (FIG. 3), the resilient catch members 46 extend at an angle from tubular body 20. When case 10 is inserted in opening 16 in instrument panel 14, resilient catch members 46 first flex inwardly when passing through the opening, and then return outwardly as their beveled front faces 48 begin to pass the rear face 14R of instrument panel 14. As shown in FIGS. 8 and 9, the beveled front face 48 of each catch member 46 is formed with a succession of steps or ridges which are spaced closely together and which are capable of engaging the rear edge 14E of instrument panel 14 where opening 16 intersects rear face 14R.

Because the catch members 46 are resilient, being biased outwardly against instrument panel 14, and because beveled surfaces 48 have a succession of steps or ridges, case 10 may be mounted upon both thin instrument panels (FIG. 8) and thick instrument panels (FIG. 9) equally well simply by inserting the case into opening 16 in instrument panel 14. It is necessary, of course, that opening 16 be dimensioned suitably to receive case 10.

As shown in FIGS. 8 and 9, whether instrument panel 14 is thick or thin, flange 42 will be held by catches 46 in abutment with the front face 14F of the instrument panel. In accordance with the present invention, front cover 26 is removably attached around flange 42 and held flush with the front face 14F of the instrument panel. As shown in FIGS. 3 and 7, cover 26, made generally of transparent clear or tinted plastic to permit viewing of instrument 12, is molded with a center wall 26C joining with a peripheral wall 26P which extends rearwardly a distance equal to the thickness of flange 42 so as to terminate at the front face 14F of the instrument panel. Flange 42 has notches 50 provided in its rear edge (FIG. 3), and cover 26 has detents 52 extending from the inside of peripheral wall 26P in locations for engagement with notches 50. Accordingly, front cover 26 is engaged with a snap fit to panel mounting member 24 simply by pressing it over flange 42 so that the detents 52 will snap into notches 50. As shown in FIGS. 4 and 6–9, front cover 26 then is in flush engagement with the front face 14F of instrument panel 14. By simply lifting it from flange 42, however, front cover 26 may be readily removed for access to trimming or adjusting elements on the front of instrument 12, such as numeral adjustment studs on digital panel meters. Case 10, therefore, may be mounted to arbitrary thicknesses of instrument panel 14, and front cover 26 automatically but removably covers opening 16 and panel mounting member 24 with a flush, esthetically pleasing, appearance.

Construction of case 10 proceeds by first extruding and cutting a tubular body 20 in the manner described above. Next, pre-molded panel mounting members 24 are attached to tubular body 20 with screw fasteners 34, the electrical instrument 12 is placed in tubular body 20, and pre-molded rear cover 22 is secured to tubular body 20 with screw fasteners 34.

To aid in locating rear wall 22 and panel mounting member 24 in proper position over the ends of tubular body 20, locating ridges 60 are provided which rest against the inside surfaces of the side walls of tubular body 20 (see FIGS. 3, 4 and 7–9). With front cover 26 either attached or removed from panel mounting member 24, the case 10 is inserted into an opening 16 in an instrument panel 14. In the manner described above, resilient catch members automatically engage the rear face 14R of the instrument panel to hold case 10 between flange 42 and beveled surfaces 48. Front cover 26 then has its peripheral wall 26P in engagement with the front face 14F of the instrument panel.

Although specific embodiments of the invention have been disclosed herein in detail, it is to be understood that this is for the purpose of illustrating the invention and should not be construed as necessarily limiting the scope of the invention, since it is apparent that many changes can be made to the disclosed structures and methods by those skilled in the art to suit particular applications.

I claim:

1. A method for making protective cases for electrical instruments of varying sizes to be mounted upon instrument panels in uniform openings provided therein, comprising:
   extruding a tubular member with a uniform cross sectional shape providing all of the side walls of the body for the case and, during extrusion, forming fastener receiving means extending throughout the length of the tubular member;
   cutting the extruded tubular member into individual bodies each with side walls of a preselected length to accommodate the particular instrument to be housed therein;
   forming a plurality of uniformly shaped panel mounting end members arranged to fit the uniform panel openings;
   fastening panel-mounting end members on the front ends of the cut tubular bodies by means of fasteners inserted in the receiving means formed in the tubular body;
   forming a plurality of uniformly shaped front covers; and
   fastening the front covers over the panel mounting end members.

2. A method for making protective cases for electrical instruments of varying sizes as claimed in claim 1, further comprising:
   providing locating ridges on the end members in positions arranged to rest against the walls of the cut tubular bodies; and
   locating the end members in relation to the cut tubular bodies for fastening by resting the locating ridges against the walls of the cut tubular bodies.

3. A method for making protective cases for electrical instruments of varying sizes as claimed in claim 1 further comprising:
   mounting the varied sizes of electrical instruments in the cut tubular bodies of preselected length; and
   enclosing the mounted electrical instruments by fastening rear covers to the cut tubular bodies by means of fasteners inserted in the receiving means formed in the tubular body.

4. A method for making protective cases for electrical instruments of varying sizes as claimed in claim 3 further comprising:
   providing locating ridges on the rear covers in positions arranged to rest against the side walls of the cut tubular bodies; and
   locating the rear covers in position for fastening by resting the locating ridges against the side walls of the cut tubular bodies.

5. A method for making protective cases for electrical instruments of varying sizes as claimed in claim 1 further comprising:
prior to fastening the panel mounting end members on the cut tubular bodies, forming the panel mounting end members with means for engaging the instrument panels in openings provided therein.

6. A method for making protective cases for electrical instruments of varying sizes as claimed in claim 1 wherein the panel mounting end members and front covers have interengaging detent means, and wherein the step of fastening the front covers to the panel mounting end members comprises engaging said detent means.

7. A method for making protective cases for electrical instruments of varying sizes as claimed in claim 1 wherein the uniformly shaped panel mounting end members are formed by molding.

8. A method for making protective cases for electrical instruments of varying sizes as claimed in claim 1 wherein the step of cutting the tubular member comprises cutting the tubular member flush and at right angles to its length, and wherein the panel mounting end members are formed with planar portions for contacting the flush cut ends of the tubular members.

9. A method for making protective cases for electrical instruments of varying sizes to be mounted on instrument panels in uniform openings provided therein, comprising:
extruding a tubular member with walls forming a rectangular cross section and, during extrusion, forming fastener receiving channels extending throughout the length of the tubular member in the interior corners thereof;
cutting the extruded tubular member into individual bodies with preselected lengths to accommodate the particular instrument to be housed therein;
providing uniformly shaped preformed panel-mounting end members having means for engaging instrument panels in openings provided therein;
fastening the panel mounting end members on the front ends of the cut tubular bodies by means of screw fasteners inserted in the fastener receiving channels formed in the tubular member;
mounting the electrical instruments within the cut tubular bodies; and
fastening rear covers on the other end of the cut tubular bodies by means of screw fasteners inserted in the fastener receiving channels formed in the tubular member.

* * * * *